Patented Aug. 9, 1949

2,478,490

UNITED STATES PATENT OFFICE 2,478,490

ROSIN MODIFIED PHENOL FORMALDEHYDE RESINS OF ENLARGED MOLECULAR SIZE

William Krumbhaar, New York, N. Y.

No Drawing. Application August 12, 1946,
Serial No. 690,082

8 Claims. (Cl. 260—25)

This invention relates to resinous esters and methods of making the same, and more particularly to rosin based hard resins of enlarged molecular size.

The rosin based resins with melting points of 130–170° C., especially rosin modified phenol formaldehyde resins and resins containing rosin esterified by polyhydric alcohols and reinforced by polybasic acids of the maleic type generally called rosin-modified maleic esters, are in use for a number of purposes including surface coatings and printing inks. These rosin-modified phenol formaldehyde resins and rosin-modified maleic resins are prepared usually by heating rosin in its various forms together with phenol formaledhyde condensates, with maleic type polybasic acids, or both, and subsequently, or during the heating process, adding an esterifying polyhydric alcohol, all ingredients combined in quantities and ratios so that no gelation occurs.

The customary commercial resins of these types, with melting points of 130 to 170° C., as they are used in the arts for surface coating and printing inks, particularly, possess relatively small molecular size, i. e., molecular weights of only 1200 to 1400 as appears from a systematic check of the molecular weights of the majority of commercial rosin based phenolic and maleic resins available today. When their molecular size is enlarged, they gain considerably in hardness, solubility, chemical resistance and heat stability.

There are several methods available to achieve this result. The usual method consists in increasing the amounts of phenol formaldehyde condensates, maleic acid type compounds, or polyhydric alcohols, to be combined with the rosin element in the resin. However, both processes and products have very definite disadvantages. For mass production purposes the procedure is not practical, because gelatinization may occur at an early moment, stopping the agitator, causing exothermic reactions, and possibly overfoaming or fire. The products, due to the excessive content of expensive additions, are high in cost, they possess low solubility, which is a distinct technical disadvantge, and contain large percentages of overpolymerized resin particles, which make them unhomogeneous and incompatible with many oils and pigments.

An improved method of obtaining large molecular resinous esters of outstanding characteristics is described in application Serial No. 666,438, filed May 1, 1946, now Patent No. 2,471,629, entitled Copal-like resinous esters. In the method described in said application, large molecular resinous esters are obtained by a process of depolymerization, i. e., resinous esters, which first are built up to molecular weights of more than 2000, are degelled until they are degraded down to molecular sizes of about 1700 to 1900. Molecular sizes of 1700 to 1900 have to be considered as large molecules, compared to the molecular weights of 1200 to 1400 for ordinary commercial resins serving the same purpose.

Among the objects of this invention is the production of resinous esters of enlarged molecular size giving such esters characteristics markedly improved over the properties of such esters before molecular agglomeration in accordance with the present invention.

Other objects of the present invention include the production of improved resinous esters high in molecular weight and in those properties important for their application in coatings and inks, such as hardness, solubility, chemical resistance, and heat stability.

Still further objects include the production of rosin based resins with melting points of 140 to 180° C., of the modified phenolic and maleic class, increased in molecular weight by molecular association and improved with respect to the characteristics set forth above.

Still further objects include methods of producing resinous esters of the character set forth above.

Other and further objects of the present invention will appear from the more detailed description set forth below, it being understood that this more detailed description is given by way of illustration and explanation only, and not by way of limitation, since various changes therein may be made by those skilled in the art without departing from the scope and spirit of the present invention.

In accordance with the present invention, resins produced in the orthodox prior art methods of manufacture, such resins having melting points of 130 to 170° C., are subjected to a vacuum treatment at temperatures not exceeding about 265° C. for a period of time in a procedure that may properly be called maturing. Conditions of temperature, vacuum and time in the maturing process can be varied in different ways and depend upon the degree of molecular association sought.

The presence of phenolic or maleic type substances in the resinous esters treated in accordance with the present invention is indispensable to effect molecular enlargement. In their absence, as in the case of plain glycerine or pentaerythritol esters, the molecular weight is not increased by the low temperature vacuum treatment.

The temperatures employed in the processes of the present invention as a general rule lie between 5 to 25° C. lower than the temperature at which the resin was manufactured and as a general rule, the temperature employed will lie between temperatures of 250° and 265° C. The upper limit of 265° C. should not generally be exceeded because decomposition and cracking may take place; but such effects may be permitted to take place to a limited extent if desired although in accordance with the present invention, the upper temperature employed is limited to avoid any decomposition and cracking.

The degree of vacuum applied during the manufacturing operation may vary within substantial limits but as a general rule should not approach a full vacuum of 29 inches, because such high vacuum tends to further decomposition processes. The maturing process of increasing the molecular weight of the resin is based on both polymerization, which proceeds without the elimination of water, and condensation, which is accompanied by the splitting off of water. It is chiefly the phase of condensation which benefits from the application of vacuum.

The length of time required for the maturing process depends on the increase of molecular weight desired. It varies with the chemical composition of the resin, and the conditions of temperature and vacuum. As a rule, the time should be not less than 16 hours and not more than 24 hours, so that in actual practice a full day and night may be added to the orthodox production cycle. The speed of molecular aggregation slows down generally after 18 hours treatment and becomes negligible after 24 hours.

The maturing process is based on painstaking requirements and controls with regard to time, temperature and vacuum, and therefore, requires carefully designed machinery and equipment.

The process of this invention is particularly applicable to the hard rosin based esters with melting points of 130 to 170° C. that are known commercially as rosin-modified phenolic and rosin-modified maleic resins, or combinations of them.

All of these esters contain at least 70% of rosin, esterified by polyhydric alcohols, such as glycols, glycerine or pentaerythritols, including the various pentaerythritols such as mono-, di- and tri-pentaerythritols, and such esters are rendered hard and resistant by phenol formaldehyde condensates, by dibasic acids of the maleic type, or by both types of the stated components. The phenol formaldehyde condensate usually employed is that obtained by alkaline condensation, usually with from 1 mol of phenol with from 2 to 4 mols of formaldehyde. The type of phenol utilized may vary widely, the principal types employed being the para-tetriary-alkyl phenols, and the dihydroxy-diphenyl-dimethyl-methane, usually called bis phenol. The amount of phenol formaldehyde condensate added to the rosin, usually varies between 10 and 40% of the rosin component.

The polybasic acids of the maleic type generally used include maleic acid, maleic anhydride, fumaric acid, or malic acid, the reacting quantities usually employed amounting to about from 3 to 18% of the rosin component.

In commercial resins, the amounts of phenol condensates, maleic type acids and polyhydric alcohols are usually adjusted so that no gelatinization of the resin can occur during the process of resin formation. In prior art processes, resin formation is considered to be complete and finished at the moment that the batch stays clear on cooling, that the acid number has dropped to values of from 20 to 35, and the melting point has increased to the desired degree of generally between 130° C. and 170° C.

The molecular weight of the resins at this stage, which general practice considers as complete and finished, is 1200 to 1400, as brought out by a systematic series of determination of a large number of commercial resins, used in the trade for coating and ink purposes. Both rosin modified phenolic and maleic resins show these values, the lower limit of 1200 applying to resins with a melting point of 130 to 140° C., the upper limit of 1400 applying to resins with melting points of 150 to 170° C.

The maturing process of the present invention increases the molecular weights substantially, i. e., by about 500, with the effect that the agglomerated or matured products show molecular weights of 1850 to 1950. Molecular weights that are obtainable in the maturing process do not exceed about 2000, because at molecular sizes beyond 2000, the resins become gelatinous, and this process is applied only to such compositions which will not gelatinize on continued heating.

The molecular weights of rosin based hard phenolic and maleic resins are very accurately determined by the classical method of freezing point depression according to Beckmann, using about 500 grams of solvent, i. e., one hundred times larger amounts of substance than customary, employing high speed mechanical stirrers, and excluding outside influences by a large outer oil bath, the temperature of which is regulated by electrical heating within fractions of a degree. As solvent for such determinations, preferably diphenylamine is utilized, which is particularly suitable because it has an exceptionally high depression constant and good solvent power for resins at the low temperature of 50 to 60° C. As a rule, 10° of the resin is dissolved: if low molecular weights are expected, additions of less than 10% are made. Readings check within one hundredth of a degree; inasmuch as depressions in these determinations vary generally between 0.5 to 1.5 degrees, the accuracy thus achieved is about 1%.

Of great importance is the fact that the method of increasing the molecular weights of resinous esters in accordance with the present invention, at the same time improves the hardness, the solubility, the chemical resistance and the heat stability of the esters, in a way heretofore unknown. Up to now it is the rule in resin production that compromises must be made with regard to creating extraordinary constants in one and the same resin, i. e., that one outstanding characteristic has to be sacrificed for another prominent characteristic. For example, if great hardness is produced, the solubility is reduced; or if high solubility is created, the chemical resistance is usually at a low point.

The maturing procedure of the present invention now makes it possible to improve several resin properties at the same time without making such compromises. For instance, the hardness improves markedly, whereas the viscosity barely changes, an observation which is quite contrary to the usual prior art experience. Furthermore, in spite of increased hardness, the solubility is improved, also an observation which reverses an old established rule of resin technology, according to which solubility decreases with increasing hardness. Another unexpected feature is the balancing of the two opposite features of chemical resistance and solubility during the maturing process, in which the molecular agglomeration produces higher chemical resistance, together with higher solubility in complete parallelism.

The hardness of matured resins, as measured by melting point, is improved by about 10° C., moving it up from a range of about 130 to 170° C., to a range of 140 to 180° C., determinations being made by the A. S. T. M. method. The increase in hardness has a very beneficial effect on the bodying and drying characteristics of the resins.

Solubility values grow decidedly during maturing. In the case of maleics, this growth is so intense that the entire character of the resin is changed. The solubility is determined by titrating a resin solution in a strong solvent with a weak solvent until an incipient cloud appears.

The chemical resistance grows with the molecular size because the resinous molecules aggregate at double bonds or other reactive points, which are easily attacked by outside influences, but which are eliminated by the process of agglomeration. This process is quite analogous to the formation of highly viscous bodied oils, the resistance of which grows during the bodying period due to inter-molecular linkages. The disappearance of weak spots in the resin molecule is indicated by the decided drop of the iodine value during the maturing process. It is also clearly indicated by the distinct slow-down in the speed with which the resins are saponified, saponification speeds actually declining 20 to 25% due to maturing. Water and alkali resistance in turn are improved accordingly.

Acid values decline steadily during the molecular aggregation due to the application of vacuum, which removes continuously volatile acids. The chemical resistance increases simultaneously, because it is the presence of such acids which lay the resins open to attack by alkali.

It lies in the nature of the maturing process which applies vacuum for a long period of time, that it reduces the loss which resins undergo on further heating in the varnish kettle with or without other resins or oils. Experience shows that matured resins have two to three times the heat stability of non-matured material. The heat loss is determined by weighing before and after heating 300 grams of resin in a 600 cc. beaker for one hour at 285° C.

The carrying out of the molecular enlargement and the properties of the large molecular resinous esters produced, are explained in detail by the following examples.

*Example 1.*—A rosin modified bis phenol resin is prepared in the following way. 100 parts of M gum rosin are heated to 160° C. and while the resin is actively agitated, 18 parts of a bis phenol formaldehyde condensate is added slowly. The condensate is produced in the usual way by combining under the influence of an alkaline catalyst, equal weights of bis phenol and 37% formaldehyde. After the condensate is dissolved in the rosin, the temperature is raised to 200° C. and 10 parts of glycerine are added. The batch is then heated up to 275° C. and held at this temperature until the glycerine is completely combined, finally applying vacuum to remove decomposition products.

In this way the customary phenolic resin, as used for coating and ink purposes, is obtained, possessing a molecular weight of 1250. For the purpose of increasing its molecular size, the temperature of the batch is now lowered to 260° C., and the kettle content is kept at this temperature under 22" vacuum for 20 hours, and then unloaded. The final product has a molecular weight of 1800, i. e., the molecular association has increased by 550 units.

The agglomeration is accompanied by substantial improvements in the technical properties of the resin. Details are recorded in the following table.

*Influence of Molecular Weight on Phenolic Resins*

| Resin Property | Characteristic Expressed as— | Molecular Weight | |
|---|---|---|---|
| | | 1250 | 1800 |
| Hardness | Melting Point | 150° C | 165° C. |
| Viscosity | Gardner Scale | Z-1–Z-2 | Z-1–Z-2. |
| Solubility | Titration | 15 cc | 25 cc. |
| Chemical Resistance | Acid Value | 25 | 10. |
| | Iodine Value | 120 | 80. |
| | Portion Saponified after 3 hours. | 100% | 70%. |
| Heat Stability | Heating Loss | 1.5% | 0.5%. |

The melting point grows distinctly with the molecular weight, whereas the viscosity remains practically unchanged.

The solubility of the resin is nearly doubled by the agglomeration procedure. The values given are the number of cc. of mineral spirits which cause cloud formation, when added slowly to a solution of 6 grams of resin in 4 grams of xylol.

With the growth of molecular size, the acid value drops to an amount which is practically equivalent to the quantity of the phenolic body used for modification, indicating at the same time nearly complete neutralization of the rosin part. The effect is improved chemical resistance.

The iodine value shows a decided drop from 120 for the non-agglomerated resin to 80 for the high molecular resin. This decrease is caused by internal linkages occurring during the procedure, which eliminate oxidizable points and other sensitive spots in the resin molecule, with the practical result of more stable and more durable products.

Chemical stability is well expressed by the speed with which resins can be saponified. Normal phenolic resins, here under consideration, as such already have great resistance to saponification. However, as the above figures indicate, saponification resistance can be increased even further by building up the molecular size. The comparative tests in the table are made by refluxing the two resin samples, dissolved in toluol, under equal conditions with an excess of potassium hydroxide, dissolved in butanol, and determining by titration after 3 hours boiling, the portion of the resin that is saponified.

The heat stability of the low molecular sample is poorer than that of the high molecular resin; the latter loses only one-third of the weight that the former loses on heating, all conditions being equal.

*Example 2.*—A rosin modified maleic resin is prepared by melting together 100 parts of WG gum rosin, 13 parts of maleic anhydride and 18 parts of glycerine, heating the batch up to 270°

C. in 12 hours, and holding it at this temperature for 6 hours, applying vacuum during the last two hours.

In this way a commercial maleic resin, as used in the trade, is obtained, possessing a molecular weight of 1375. For the purpose of increasing the molecular size, the temperature of the batch is now lowered to 255° C., and the kettle content is kept at this temperature under a 26" vacuum for 24 hours. The final product has a molecular weight of 1950, i. e., the molecular association has increased by 575 units.

The agglomeration is accompanied by important improvements in the technical characteristics of the resin, details of which are reported in the following table:

*Influence of Molecular Weight on Maleic Resin*

| Resin Property | Characteristic Expressed as— | Molecular Weight | |
|---|---|---|---|
| | | 1375 | 1950 |
| Hardness | Melting Point | 150° C. | 160° C. |
| Viscosity | Gardner Scale | Y-Z | Y-Z. |
| Solubility | Titration | 15 cc. | 80 cc. |
| Chemical Resistance | Acid Value | 30 | 15. |
| | Iodine Value | 105 | 80. |
| | Portion Saponified after 1½ hours. | 100% | 80%. |
| Heat Stability | Heating Loss | 3% | 1%. |

The hardness of the resins as measured by their melting points increases from 150° to 160° C., with the growth of the molecular size. However, the resin viscosity, measured by comparing a 60% resin solution in xylol with the standards of the Gardner scale, remains practically unchanged, in spite of the molecular association.

The solubility characteristics of the maleic resin under investigation are changed basically by the molecular growth. The solubility is determined by titrating 10 grams of a solution of 60 parts of resin in 40 parts of xylol, with mineral spirits, until an incipient cloud appears, and is expressed by the number of cc. of mineral spirits used to reach this point. It shows a decided rise from 15 cc. to 80 cc.

Chemical stability is expressed in the table in terms of the acid value, the iodine value and the speed of saponification. Acid and iodine values are measured in the ordinary way. For the determination of the speed of saponification, the resins are saponified in toluol butanol solutions, measuring by back titration the percentages of saponified material after a given length of time.

With increasing molecular agglomeration of the maleic resin in the above described example, the acid value decreases from 30 to 15. The reduction in acidity improves the chemical resistance, because free acids lay them open to the attack of aqueous solutions.

Iodine values drop from 105 to 80, indicating the disappearance of weak spots with increasing molecular size.

Molecular association causes a distinct slowdown in the speed with which the resins are saponified; in the above case only 85% of the high molecular resin are saponified under conditions under which the lower molecular resin is saponified 100%, which means in terms of technical evaluation, that the water and alkali resistance of the resins increase with the growth in molecular size.

Higher molecular weight also improves the heat stability, as indicated by a decrease in heating loss from 3% for the low molecular to 1% for the high molecular material. Good heat stability reduces the cooking losses in the varnish kettle, which is an important economic advantage.

*Example 3.*—A rosin modified alkyl phenol resin is prepared in the following way. 100 parts of N wood rosin are melted and to the melt is added, at 180° C., an amount of 30 parts of a condensate made by alkaline condensation of 1 mol para tertiary amyl phenol and 2 mols formaldehyde in the usual procedure. After the phenol component is absorbed, 10 parts of pentaerythritol are added and the batch is heated up to 275° C. and held there for complete esterification.

The resulting product is a customary resin as used for coating and ink purposes. It possesses a molecular weight of 1400. In order to carry out the molecular agglomeration, this resin is then heated at the considerably decreased temperature of 255° C., for 22 hours and under a vacuum of 25". After this treatment the resin is unloaded. The final product has a molecular weight of 1900, meaning that the molecular association has increased by 500. It is accompanied by the same pronounced improvements of technical characteristics which have been described in detail in Examples 1 and 2.

*Example 4.*—A rosin modified, combined phenolic and maleic type resin is prepared in the following way. 100 parts of polymerized WW rosin are fused with 5 parts of fumaric acid and heated up to 200° C. At this temperature 20 parts of a condensate made by alkaline condensation of one mol para tertiary butyl phenol and two mols formaldehyde in the usual procedure, are added and reacted slowly. The temperature is raised and gradually an addition of 10 parts of glycerine is made. When 275° C. is reached, the temperature is kept constant, until the esterification is complete, as evidenced by the clearness of the batch and its acid number.

The final product is a commercial resin of the customary type, used in the trade for surface coatings and printing inks, and possesses a molecular weight of 1350. It is then subjected to further heating at 260° C. under 24" of vacuum for 18 hours. Thereby a steady molecular association is caused, increasing the molecular weight to reach 1825 at unloading time.

The high molecular, matured resin is distinguished over the low molecular customary commercial resin by all the technical advantages, described in detail in the previous examples.

Having thus set forth my invention, I claim:

1. The method of maturing resinous esters which comprises heating to a temperature of from 250 to 265° C. for from 16 to 24 hours under vacuum of from 22" to 29" of mercury a non gelatinizing rosin modified phenol formaldehyde resin in which at least 70% of the rosin is esterified by polyhydric alcohol selected from the group consisting of glycerine and pentaerythritol, the phenol being selected from the group consisting of bis phenol and paratertiary alkyl phenols, said non gelatinizing rosin modified phenol formaldehyde resin having a melting point of 130 to 170° C. and a molecular weight of about 1200 to 1400, to produce a matured ester of melting point of 140 to 180° C. and molecular weight of about 1800 to 2000 and simultaneously increased hardness, solubility, chemical resistance and heat stability.

2. The method as set forth in claim 1 in which the polyhydric alcohol is glycerine.

3. The method as set forth in claim 1 in which the polyhydric alcohol is pentaerythritol.

4. The method as set forth in claim 1 in which the phenol is bis phenol.

5. The method as set forth in claim 1 in which the phenol is a paratertiary alkyl phenol.

6. A matured rosin ester resulting from the process of claim 1.

7. A matured rosin ester as set forth in claim 6 in which the polyhydric alcohol is glycerine.

8. A matured rosin ester as set forth in claim 6 in which the phenol is bis phenol.

WILLIAM KRUMBHAAR.

REFERENCES CITED

The following references are of record in the file of this patent:

UNITED STATES PATENTS

| Number | Name | Date |
|---|---|---|
| 1,967,232 | Ellis | July 24, 1934 |
| 2,039,243 | Krzikalla et al. | Apr. 28, 1936 |
| 2,072,810 | Coburn | Mar. 2, 1937 |
| 2,256,444 | Rosenblum | Sept. 16, 1941 |
| 2,322,197 | Oswald | June 15, 1943 |

FOREIGN PATENTS

| Number | Country | Date |
|---|---|---|
| 259,030 | Great Britain | Oct. 7, 1926 |